US 9,003,829 B2

(12) United States Patent
Bauer et al.

(10) Patent No.: US 9,003,829 B2
(45) Date of Patent: Apr. 14, 2015

(54) NITROGEN REMOVAL FROM NATURAL GAS

(75) Inventors: Heinz Bauer, Ebenhausen (DE); Martin Gwinner, Polling (DE); Daniel Garthe, Aiterhofen (DE)

(73) Assignee: Linde Aktiengesellschaft, Munich (DE)

( * ) Notice: Subject to any disclaimer, the term of this patent is extended or adjusted under 35 U.S.C. 154(b) by 86 days.

(21) Appl. No.: 13/105,048

(22) Filed: May 11, 2011

(65) Prior Publication Data

US 2011/0277500 A1 Nov. 17, 2011

(30) Foreign Application Priority Data

May 12, 2010 (DE) .......................... 10 2010 020 282

(51) Int. Cl.
*F25J 3/00* (2006.01)
*F25J 3/02* (2006.01)
(Continued)

(52) U.S. Cl.
CPC .............. *F25J 3/0209* (2013.01); *F25J 3/0406* (2013.01); *F25J 3/0635* (2013.01); *F25J 3/04284* (2013.01);
(Continued)

(58) Field of Classification Search
CPC ....... F25J 3/0209; F25J 3/0233; F25J 3/0257; F25J 3/0266; F25J 3/0403; F25J 3/04048; F25J 3/0406; F25J 3/04187; F25J 3/04284; F25J 3/04315; F25J 3/04351; F25J 2200/96; F25J 2215/42; F25J 2215/60; F25J 2230/42; F25J 2230/60; F25J 2200/80; F25J 2200/94; F25J 3/066; F25J 3/0635; F25J 2200/62; F25J 2235/42; F25J 2245/42; F25J 2270/02; F25J 2270/08; F25J 2270/42
USPC ........... 62/618, 619, 620, 625, 630, 632, 927, 62/930
See application file for complete search history.

(56) References Cited

U.S. PATENT DOCUMENTS 2,471,134 A * 5/1949 Wright ........................ 196/111
3,596,472 A * 8/1971 Streich ........................... 62/623
(Continued)

FOREIGN PATENT DOCUMENTS

DE 3811132 10/1989
DE 3919627 12/1990

OTHER PUBLICATIONS

European Search Report in EP Application No. 11 00 3608. Dated: Nov. 5, 2014.
(Continued)

*Primary Examiner* — John F Pettitt
*Assistant Examiner* — Ignacio E Landeros
(74) *Attorney, Agent, or Firm* — Miller, White, Zelano, Branigan, P.C.

(57) ABSTRACT

The invention relates to a method for the separation of a hydrocarbon-rich, nitrogen-containing feed fraction (1, 101), preferably natural gas, wherein the feed fraction (1, 101) is at least in part liquefied (E1, E2) and divided by rectification (T1) into a nitrogen-enriched fraction (14, 110) and a hydrocarbon-rich, nitrogen-depleted fraction (11, 111) and wherein, in the upper region of the rectification (T1), a nitrogen-enriched stream (14) is taken off, cooled (E3) and applied (20) at least in part to the rectification (T1) as reflux and/or the nitrogen-enriched fraction (110) is cooled and partially condensed (E3), applied at least in part to the rectification (T1) as reflux (115) and the remaining stream (116) of the nitrogen-enriched fraction (110) is subjected to a double-column process (T3). According to the invention, in the middle region of the rectification (T1), a carbon-dioxide-poor stream (13, 113) which serves for cooling (E3) the nitrogen-enriched substream (14) and/or cooling (E3) the nitrogen-enriched fraction (110) is taken off and the feed fraction is rectified (T1) in a separation column (T1) having a dividing wall (W), wherein the dividing wall (W) is arranged at least in the region of the separation column (T1) in which the feed fraction (2, 4, 5, 102, 104, 105) is fed to the separation column (T1) and the carbon-dioxide-poor stream (13, 113) is taken off.

16 Claims, 2 Drawing Sheets

(51) Int. Cl.
 F25J 3/04 (2006.01)
 F25J 3/06 (2006.01)
(52) U.S. Cl.
 CPC ............ F25J 3/04187 (2013.01); F25J 3/0233
 (2013.01); F25J 3/0257 (2013.01); F25J
 2200/04 (2013.01); F25J 2200/08 (2013.01);
 F25J 2200/50 (2013.01); F25J 2200/74
 (2013.01); F25J 2200/78 (2013.01); F25J
 2200/96 (2013.01); F25J 2205/04 (2013.01);
 F25J 2220/66 (2013.01); F25J 2235/60
 (2013.01); F25J 2245/02 (2013.01); F25J
 2270/04 (2013.01); F25J 2270/88 (2013.01);
 Y02C 10/12 (2013.01); F25J 2200/38
 (2013.01); F25J 2200/06 (2013.01); F25J
 2270/02 (2013.01); Y10S 62/927 (2013.01)

(56) References Cited

U.S. PATENT DOCUMENTS

| 4,163,652 | A | * | 8/1979 | Gazzi et al. ...................... 62/622 |
| 4,278,457 | A | * | 7/1981 | Campbell et al. ............... 62/621 |
| 4,415,345 | A | | 11/1983 | Swallow |
| 4,662,919 | A | | 5/1987 | Davis |
| 4,664,686 | A | | 5/1987 | Pahade et al. |
| 5,257,505 | A | | 11/1993 | Butts |
| 6,412,302 | B1 | * | 7/2002 | Foglietta ......................... 62/611 |
| 6,453,698 | B2 | * | 9/2002 | Jain et al. ........................ 62/621 |
| 7,152,429 | B2 | * | 12/2006 | Paradowski ..................... 62/620 |
| 8,323,457 | B2 | | 12/2012 | Townsend |
| 2010/0108487 | A1 | | 5/2010 | Townsend |

OTHER PUBLICATIONS

Bauer, H.C. et al. "CO2 Tolerant N2 Rejection from Natural Gas", AICHE Spring Meeting & 11th Topical Conference on Natural Gas Utilization; Chicago, IL, Mar. 13-17, 2011.

Abstract DE 3811132; "Separation of nitrogen from CO2-containing natural gas"; Inventor: Paul Kummann et al. Applicant: Linde AG. Publication Date: Oct. 12, 1989. (Espacenet Machine Translation).

Abstract DE 3919627; "Nitrogen removal—from natural gas contg. carbon dioxide by low temp. rectification in several sepn. stages"; Inventor: Rudolf Stockmann; Applicant: Linde AG. Publication Date: Dec. 20, 1990. (Espacenet Machine Translation).

* cited by examiner

NITROGEN REMOVAL FROM NATURAL GAS

The invention relates to a method for the separation of a hydrocarbon-rich, nitrogen-containing feed fraction, preferably natural gas, a) wherein the feed fraction is at least in part liquefied and divided by rectification into a nitrogen-enriched fraction and a hydrocarbon-rich, nitrogen-depleted fraction and b) wherein, in the upper region of the rectification, a nitrogen-enriched stream is taken off, cooled and applied at least in part to the rectification as reflux and/or c) the nitrogen-enriched fraction is cooled and partially condensed, applied at least in part to the rectification as reflux and the remaining stream of the nitrogen-enriched fraction is subjected to a double-column process.

Methods of the type in question for liquefying natural gas, in which a cryogenic nitrogen removal is effected, or which have what is termed a nitrogen rejection unit (NRU) require that components having a high melting temperature such as, for example, carbon dioxide, that are contained in the natural gas are taken into account in the process design in order to effectively prevent unwanted freezing out of such components in the cold process sections.

Since the maximum solubility of carbon dioxide is substantially dependent on the temperature of the solvent—for example liquid hydrocarbons—, methods of the type in question which proceed at elevated pressure, are more carbon dioxide-tolerant than those which are operated at low pressure and thus lower fluid temperatures. The expression "elevated pressure" in this case is taken to mean pressures of greater than 20 bar.

In a typical double-column method, as is known, for example, from U.S. Pat. No. 4,415,345, the low temperature profile in the low-pressure column enforces a carbon dioxide depletion in the feed gas to a few ppm. In order to achieve this, complex prepurification, for example by means of an amine scrubbing, must be provided.

If the pressure of the carbon-dioxide-containing process streams, in contrast, is kept high, the higher temperatures resulting there from make possible carbon dioxide concentrations in the low percentage range without the risk of carbon dioxide solid formation. This concept is successfully employed in what is termed the single-column method. In this case, the nitrogen-containing natural gas is separated at a pressure of up to 30 bar into a nitrogen-rich overhead fraction and a hydrocarbon-rich bottom-phase fraction.

In U.S. Pat. No. 4,662,919, a method having an $N_2/CH_4$ separation column operated at elevated pressure is described. The overhead temperature of a column of this type is approximately −150° C. at 25 bar. The refrigerant used is methane in high purity—in relation to ethane and higher hydrocarbons, carbon dioxide and water—which is vaporized at a pressure of approximately 2 bara. In such a method having a closed cooling circuit, the availability of the refrigerant is restricted. Customary pipeline gas must be purified in a complex manner. Furthermore, the storage of the expensively produced refrigerant in the event of plant shutdown is generally only economically possible as a liquid, i.e. LNG.

U.S. Pat. No. 5,257,505 discloses a method having a similar rectification column. In this case, however, an open cooling circuit is used in which some of the bottom-phase product of the rectification column, after expansion to approximately 2 bar, is used for top cooling. This dispenses with the complex provision and storage of the refrigerant. Owing to the lower boiling temperature of the bottom-phase product used for cooling, the feed gas, in this case, may contain just a few percent, but still several hundreds of ppm of carbon dioxide in order to prevent the carbon dioxide from freezing out in the bottom-phase product during the vaporization in the overhead condenser. The supply of refrigerant in this procedure which is simpler compared with the above described closed circuit therefore reduces the carbon dioxide tolerance by approximately a factor of 100. In many cases, an amine scrubbing is then required for the pretreatment in order to decrease the carbon dioxide content to values acceptable for the subsequent liquefaction process.

Nitrogen removal from natural gas by means of a double-column method, as described, for example in U.S. Pat. No. 4,415,345, generally requires approximately 30% by volume nitrogen in the feed gas in order to be able to achieve the customary purities for the product streams nitrogen (<1% by volume methane) and natural gas (<5% by volume nitrogen). If the nitrogen content falls below this minimum value at times or always, inter alia, enrichment of the nitrogen concentration is initiated by removal of a nitrogen-poor, hydrocarbon-rich fraction in a preliminary separation or enrichment column. Such a procedure is described, for example, in U.S. Pat. No. 4,664,686. The gas phase of the enrichment column that is enriched to at least 30% by volume nitrogen is then separated in a conventional NRU having a double column into a nitrogen-rich fraction and also two substreams of the nitrogen-poor, hydrocarbon-rich fraction. In this case, one substream of the carbon-dioxide-containing bottom-phase product of the double column is used for cooling the overhead condenser. The use of open or closed circuits for supporting the separation efficiency is not usual in double-column methods.

In such a double-column method having an enrichment column, the low temperature profile—this means the threat of carbon dioxide solids precipitation—in the low-pressure part of the double column enforces carbon dioxide depletion in the feed gas to less than 50 ppm, which must be set by a complex prepurification, for example an amine scrubbing. The gas fraction that is increased with respect to its nitrogen content by the enrichment column should be freed, by a suitable process procedure, from carbon dioxide to the extent that feed gases having an elevated carbon dioxide content of 1 to 3% by volume can also be processed without an amine scrubbing, without causing solids problems in the region of the double column.

It is an object of the present invention to specify a method of the type in question for the separation of a hydrocarbon-rich, nitrogen-containing feed fraction, which method avoids the above-mentioned disadvantages.

Upon further study of the specification and appended claims, other objects and advantages of the invention will become apparent.

For achieving these objects, a method for the separation of a hydrocarbon-rich, nitrogen-containing feed fraction is proposed, which method is characterized in that d) in the middle region of the rectification, a carbon-dioxide-poor stream which serves for cooling the nitrogen-enriched substream and/or cooling the nitrogen-enriched fraction is taken off and e) the feed fraction is rectified in a separation column having a dividing wall, wherein the dividing wall is arranged at least in the region of the separation column in which the feed fraction is fed to the separation column and the carbon-dioxide-poor stream is taken off.

Further advantageous embodiments of the method according to the invention for the separation of a hydrocarbon-rich, nitrogen-containing feed fraction are characterized in that the carbon-dioxide-poor stream is expanded upstream of the heat exchange with the nitrogen-enriched stream that is to be cooled and/or upstream of the heat exchange with the nitrogen-enriched fraction that is to be cooled, at least one substream of the nitrogen-enriched fraction that is taken off from the separation column is expanded to produce cold, the hydrocarbon-rich, nitrogen-depleted fraction that is taken off from the separation column is expanded, vaporized and superheated, and is preferably then compressed, the separation column is operated at a pressure between 15 and 35 bar, preferably between 25 and 30 bar and/or a substream of the liquid nitrogen-rich fraction obtained in the double-column process is expanded, vaporized and superheated and added to the carbon-dioxide-poor stream that is acting as refrigerant.

The method according to the invention and other embodiments of the method are explained in greater detail below with reference to the illustrative embodiment shown in the drawings. Various other features and attendant advantages of the present invention will be more fully appreciated as the same becomes better understood when considered in conjunction with the accompanying drawings.

BRIEF DESCRIPTION OF THE DRAWINGS

The method according to the invention for liquefying a hydrocarbon-rich, nitrogen-containing feed fraction and also further advantageous embodiments of said method are described in more detail hereinafter with reference to the drawings, wherein:

As shown in FIG. 1, the hydrocarbon-rich feed fraction, which is, for example, a natural gas stream, is conducted via line 1 through the heat exchangers E1 and E2 and partially liquefied against process streams that are to be warmed, which will be considered in more detail hereinafter. The partially liquefied natural gas stream is divided in a separator D2 downstream of the heat exchanger E2 into a liquid fraction 2 and a gas fraction 3. Whereas the liquid fraction 2 is expanded in the valve V1 and then fed to the rectification or separation column T1, the gas fraction 3 taken off from the separator D2 is partially condensed in the heat exchanger E1 and, in a separator D1 downstream of the heat exchanger E1, is again divided into a liquid fraction 4 and a gas fraction 5. The liquid fraction 4 is warmed in the heat exchanger E1, expanded in the valve V2 and fed to the separation column T1 likewise in the middle region thereof. The gas fraction 5 that is taken off from the separator D1 is cooled in the heat exchanger E1 and partially condensed, then expanded in the valve V3 and likewise fed to the separation column T1 above the feed-in points of the two abovementioned fractions.

Figure 1:
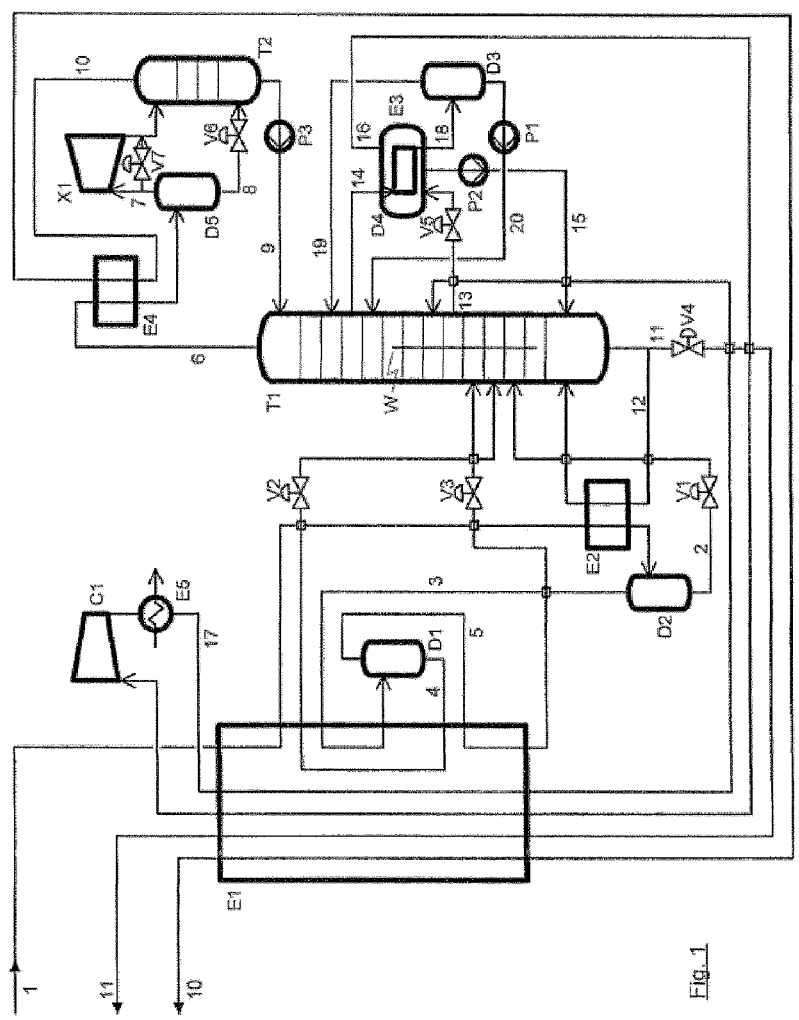
FIGS. 1 and 2 each illustrate embodiments of the invention.

The above-described preseparation of the natural gas stream in the separators D1 and D2 improves the separation efficiency in the separation column T1 and decreases the energy requirement thereof in comparison with a separation task in which a preseparation is dispensed with. The separation column T1 typically operates at a pressure between 20 and 35 bar, preferably between 25 and 30 bar.

At the top of the separation column T1, a nitrogen-enriched fraction is taken off via line 6. This fraction is partially condensed in the heat exchanger E4 and, in the downstream separator D5, is divided into a liquid fraction 8 and also a gas fraction 7. The latter is expanded in the expansion turbine X1 to produce cold and passed to the top of the second separation column T2. By means of the separation column T2, nitrogen-enriched fraction 6 is further purified from methane in such a manner that the methane content in the nitrogen-enriched fraction 10, removed from the top of separation column T2, is a maximum of 1% by volume. The valve V7 serves for a possible reduction of the cold output of the expansion turbine X1.

The liquid fraction 8 obtained in the separator D5 is likewise fed to the separation column T2 via valve V6. From the bottom phase of the separation column T2, a methane-rich liquid fraction is taken off via line 9 and fed by means of the pump P3 to the separation column T1 as reflux. This process procedure supports the fine purification proceeding in the separation column T1. The nitrogen-enriched fraction taken off at the top of the separation column T2 via line 10 is warmed in the heat exchangers E4 and E1 and taken off from the plant.

From the bottom phase of the separation column T1, via line 11, a hydrocarbon-rich, nitrogen-depleted fraction is taken off; the nitrogen content thereof is approximately 1 to 5 mol %. A substream of this liquid fraction is recirculated via line 12, after vaporization in the heat exchanger E2, which serves as reboiler, into the separation column T1. Ethane, higher hydrocarbons and also carbon dioxide are delivered, except for small traces, with the liquid fraction 11 that is taken off from the bottom phase of the separation column T1. The liquid fraction 11 is expanded in the valve V4, vaporized and superheated in the heat exchanger E1 and optionally recompressed by means of a compressor that is not shown in the figure.

According to the invention, in the middle region of the separation column T1, a carbon-dioxide-poor stream 13 is taken off, expanded in the valve V5 to a pressure of 1.5 to 4 bara, preferably 2 to 3 bara, and fed to the heat exchanger E3 which serves as the main or overhead condenser. This carbon-dioxide-poor stream 13 serves according to the invention as refrigerant for the overhead condenser E3. Thus, the use known from the prior art of a substream of the carbon-dioxide-containing bottom-phase product as refrigerant, or the provision of an external refrigerant, is dispensed with.

In order to achieve a carbon dioxide content for carbon-dioxide-poor stream 13 that is less than 100 ppm, preferably less than 20 ppm, the separation column T1 is provided according to the invention with a dividing wall W. In this case, the dividing wall W must be provided at least in the region of the separation column T1 in which the feed fractions 2, 4 and 5 are fed to the separation column and the carbon-dioxide-poor stream 13 is taken off. The dividing wall W thus prevents the carbon-dioxide-containing feed fraction or fractions 2, 4 and 5 from coming into contact with the carbon-dioxide-poor stream 13. In the lower and the upper section of the separation column T1, such a dividing wall is dispensed with.

By setting suitable reflux ratios on the left and right of the dividing wall W, not only can the increased amounts of carbon dioxide of the carbon-dioxide-containing feeds 2, 4 and 5 be forced into the bottom phase of the separation column T1, but also the desired carbon dioxide purity of the carbon-dioxide-poor stream 13 can be set.

The carbon-dioxide-poor stream 13 that is used as refrigerant is at least partially vaporized at low pressure in the heat exchanger E3, fed via line 16 to the heat exchanger E1 and warmed therein, then compressed, preferably in a multiple stage manner, in the compressor C1 to at least the pressure prevailing in the separation column T1, cooled in the downstream heat exchanger E5, liquefied and subcooled in the heat exchanger E1 and finally fed back to the separation column T1 in the region on the right-hand side of the dividing wall W above the takeoff point 13.

The carbon-dioxide-poor stream 13 used as refrigerant cools in the heat exchanger E3 a nitrogen-enriched stream that is taken off via line 14 from the upper region of the separation column T1, which nitrogen-enriched stream, after passage through the heat exchanger E3, is fed via line 18 to a separator D3 and, therein, divided into a liquid fraction 20 and a gas fraction 19. The latter is fed to the separation column T1 above the takeoff point 14, likewise the liquid fraction 20, which is applied as reflux to the separation column T1 by means of the pump P1.

The overhead condenser E3 is preferably, as shown in the figure, constructed as a bath evaporator having an enclosing vessel D4. This design has the advantage that the liquid refrigerant need not be completely vaporized, and therefore an unwanted enrichment of carbon dioxide can be avoided. In this case, a discharge can be taken off from the vessel D4 and conducted into the bottom phase of the separation column T1 via line 15 by means of the pump P2, whereby the carbon dioxide enrichment in the vessel D4 can be limited.

By means of the provision of a side stream 13 having a low carbon dioxide concentration, the comparatively high carbon dioxide tolerance of a method described at the outset with closed refrigeration circuit can be maintained, without the disadvantages of the complex refrigerant purification and storage needing to be accepted.

Figure 2:
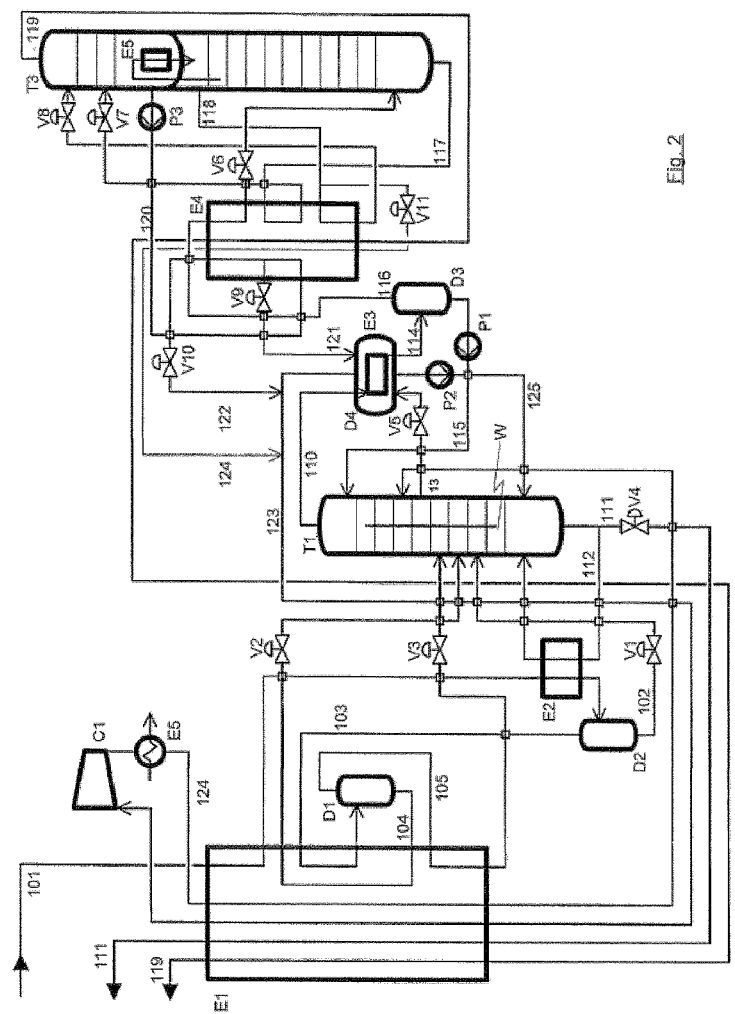

In the embodiment of the method according to the invention shown in FIG. 2, the hydrocarbon-rich feed fraction is conducted via line 101 through the heat exchangers E1 and E2 and partially liquefied against process streams that are to be warmed, which will be considered in more detail hereinafter. The partially liquefied natural gas stream is divided in a separator D2 downstream of the heat exchanger E2 into a liquid fraction 102 and a gas fraction 103. Whereas the liquid fraction 102 is expanded in the valve V1 and then fed to the rectification or separation column T1, the gas fraction 103 taken off from the separator D2 is partially condensed in the heat exchanger E1 and, in a separator D1 downstream of the heat exchanger E1, is again divided into a liquid fraction 104 and a gas fraction 105. The liquid fraction 104 is warmed in the heat exchanger E1, expanded in the valve V2 and fed to the separation column T1 likewise in the middle region thereof. The gas fraction 105 taken off from the separator D1 is cooled in the heat exchanger E1 and partially condensed, then expanded in the valve V3 and likewise fed to the separation column T1 above the feed-in points of the two abovementioned fractions. In this embodiment also the separation column T1 typically operates at a pressure between 20 and 35 bar, preferably between 25 and 30 bar.

At the top of the separation column T1, a nitrogen-enriched fraction is taken off via line 110. The nitrogen-enriched fraction 110 is cooled and partially condensed in the heat exchanger E3 and, in the downstream separator D3, is divided into a gas fraction 116 and a liquid fraction 115; the latter is applied to the rectification T1 as reflux by means of pump P1. The gas fraction 116, which has a nitrogen content of at least 30% by volume, is cooled and at least partially condensed in the heat exchanger E4, expanded in the valve V6 and fed to the high-pressure column of a double column T3, as is known from the prior art. The fraction 116 fed to the double column T3 contains at most 20 ppm, preferably less than 5 ppm, of carbon dioxide, in order to avoid solids problems in the double column T3.

From the bottom phase of the high-pressure column of the double column T3, a methane-rich liquid fraction 117 is taken off, subcooled in the heat exchanger E4 and expanded via valve V7 into the low-pressure column of the double column T3. At the top of the high-pressure column of the double column T3, a liquid, nitrogen-rich gas fraction 118 is taken off, subcooled in the heat exchanger E4 and delivered via valve V8 to the low-pressure column of the double column T3. The high-pressure column and the low-pressure column of the double column T3 are coupled via a heat exchanger E5.

A substream 124 of the abovementioned liquid, nitrogen-rich fraction 118 that is obtained in the double-column process T3 is expanded in the valve V11, vaporized and superheated in the heat exchanger E4 and added to the carbon-dioxide-poor stream 123 acting as refrigerant. This process procedure serves to increase the amount of nitrogen in the gas fraction 116 taken off at the top of the separator D3 and increases the range of variable nitrogen concentration in the feed fraction 101 which can be processed without partial load problems in the double column T3.

At the top of the low-pressure column of the double column T3, a nitrogen-enriched gas fraction 119 is taken off, warmed in the heat exchangers E4 and E1 and taken off from the plant.

From the bottom phase of the low-pressure column of the double column T3, by means of the pump P3, a methane-rich liquid fraction 120 is taken off, vaporized in the heat exchanger E4 and fed via valve V10 to the carbon-dioxide-poor fraction 123 which will be considered in more detail hereinafter. A substream 121 of the liquid fraction 120 is expanded via valve V9 into the heat exchanger E3 and thereby supports the cooling in the heat exchanger E3.

From the bottom phase of the separation column T1, via line 111, a hydrocarbon-rich, nitrogen-depleted fraction is taken off; the nitrogen content thereof is up to 5 mol %. A substream of this liquid fraction is recirculated via line 112 after vaporization in the heat exchanger E2, which serves as reboiler, into the separation column T1. Ethane, higher hydrocarbons and also carbon dioxide are delivered, except for small traces, with the liquid fraction 111 that is taken off from the bottom phase of the separation column T1. The liquid fraction 111 is expanded in the valve V4, vaporized and superheated in the heat exchanger E1 and optionally recompressed by means of a compressor that is not shown in the figure.

According to the invention, in the middle region of the separation column T1, a carbon-dioxide-poor stream 13 is taken off, expanded in the valve V5 to a pressure of 5 to 15 bara, preferably 7 to 10 bara, and fed to the heat exchanger E3 which serves as the main or overhead condenser. This carbon-dioxide-poor stream 13 serves according to the invention as refrigerant for the overhead condenser E3. Thus, the use known from the prior art of a substream of the carbon-dioxide-containing bottom phase product as refrigerant, or the provision of an external refrigerant, is dispensed with.

The carbon-dioxide-poor stream 13 that is used as refrigerant is at least partially vaporized in the heat exchanger E3, fed via line 123 to the heat exchanger E1 and warmed therein, then compressed, preferably in a multistage manner, in the compressor C1 to at least the pressure prevailing in the separation column T1, cooled in the downstream heat exchanger E5, liquefied and subcooled in the heat exchanger E1 and finally fed back to the separation column T1 in the region on the right-hand side of the dividing wall W above the takeoff point 13.

The overhead condenser E3 is preferably constructed as a bath evaporator having an enclosing vessel D4. This design has the advantage that the liquid refrigerant need not be completely vaporized, and therefore an unwanted enrichment of carbon dioxide can be avoided. In this case, a discharge can be taken off from the vessel D4 and conducted into the bottom phase of the separation column T1 via line 125 by means of the pump P2, whereby the carbon dioxide enrichment in the vessel D4 can be limited.

Compared with a method described at the outset having an open refrigeration circuit, in the case of the method according to the invention, it is possible to dispense with removal of carbon dioxide from the feed fraction or the natural gas stream, as is performed to date, for example, in the form of an amine scrubbing, and would be necessary at a carbon dioxide concentration of ≥100 ppm in the feed fraction.

Therefore, the economically desirable properties of the two reference methods described at the outset are retained in a targeted manner, without inheriting the disadvantages thereof.

The entire disclosure[s] of all applications, patents and publications, cited herein and of corresponding German Application No. 10 2010 020 282.7, filed May 12, 2010 are incorporated by reference herein.

The preceding examples can be repeated with similar success by substituting the generically or specifically described reactants and/or operating conditions of this invention for those used in the preceding examples.

The invention claimed is:

1. A method for the separation of a hydrocarbon-rich, nitrogen-containing feed fraction (1, 101), said method comprising:
   a) at least in part liquefying (E1, E2) the feed fraction (1, 101) and dividing the at least partially liquefied feed fraction by rectification (T1) into a first nitrogen-enriched fraction (6), a second nitrogen-enriched fraction (14) and a hydrocarbon-rich, nitrogen-depleted fraction (11, 111),
   b) removing said first nitrogen-enriched fraction (6) from the top of the rectification (T1), cooling said first nitrogen-enriched fraction) and introducing at least in part said first nitrogen-enriched fraction to the rectification (T1) as reflux, removing said second nitrogen-enriched fraction (14) from the upper region of the rectification (T1), cooling said second nitrogen-enriched fraction (14) (E3) and introducing (20) at least in part said second nitrogen-enriched fraction (14) to the rectification (T1) as additional reflux,
   c) removing from the middle region of the rectification (T1), a carbon-dioxide-poor stream (13) which serves for cooling (E3) said second nitrogen-enriched fraction (14), whereby said carbon-dioxide-poor stream (13) becomes at least partially vaporized,
   d) warming (E1) the at least partially vaporized carbon-dioxide-poor stream (13) against said hydrocarbon-rich, nitrogen-containing feed fraction (1),
   e) compressing (C1) the warmed carbon-dioxide-poor stream (13),
   f) liquefying (E1) the compressed carbon-dioxide-poor stream (13), and
   g) introducing the liquefied carbon-dioxide-poor stream (13) to the rectification (T1), and
   wherein rectification of the feed fraction (T1) is conducted in a separation column (T1) having a dividing wall (W), the dividing wall (W) being arranged at least in the region of the separation column (T1) in which the feed fraction (2, 4, 5, 102, 104, 105) is fed to the separation column (T1) and the carbon-dioxide-poor stream (13) is removed from the separation column.

2. A method according to claim 1, wherein the carbon-dioxide-poor stream (13) is expanded (V5) upstream of the heat exchange (E3) with said second nitrogen-enriched stream (14) that is to be cooled.

3. A method according to claim 1, wherein at least one substream (7) of said first nitrogen-enriched fraction (6) removed from the separation column (T1) is expanded (X1) to produce cold.

4. A method according to claim 1, wherein the hydrocarbon-rich, nitrogen-depleted fraction (11, 111) removed from the separation column (T1) is expanded (V4), vaporized and superheated (E1).

5. A method according to claim 1, wherein the separation column (T1) is operated at a pressure between 15 and 35 bar.

6. A method according to claim 1, wherein said hydrocarbon-rich, nitrogen-containing feed fraction (1, 101) is natural gas.

7. A method according to claim 4, wherein the hydrocarbon-rich, nitrogen-depleted fraction (11, 111), after being vaporized and superheated (E1), is then compressed.

8. A method according to claim 1, wherein the separation column (T1) is operated at a pressure between 20 and 35 bar.

9. A method according to claim 1, wherein the separation column (T1) is operated at a pressure between 25 and 30 bar.

10. A method according to claim 1, wherein the at least in part liquefied feed fraction, before being divided by rectification, is divided in a separator into a first liquid fraction and a first gas fraction, and the first liquid fraction is expanded and then fed to said separation column (T1).

11. A method according to claim 10, wherein the first gas fraction is partially condensed in a heat exchanger E1 and divided in a separator into a second liquid fraction and a second gas fraction, and the second liquid fraction is warmed in a heat exchanger, expanded and fed to said separation column (T1).

12. A method according to claim 11, wherein the second gas fraction is cooled in a heat exchanger (E1) and partially condensed, then expanded and fed to said separation column (T1) at a point above the feed points of the first liquid fraction and the second liquid fraction.

13. A method according to claim 1, wherein said first nitrogen-enriched fraction removed from the top of the rectification is partially condensed in a heat exchanger and divided in a separator into a liquid fraction and a gas fraction, and the gas fraction is expanded in an expansion turbine and introduced to the top of a further separation column (T2).

14. A method according to claim 13, wherein said liquid fraction is also fed to said separation column and a further liquid fraction is removed from said separation column and fed by a pump to said separation column (T1) as further additional reflux.

15. A method according to claim 1, wherein said carbon-dioxide-poor stream is expanded before being used for cooling said second nitrogen-enriched fraction.

16. A method according to claim 15, after being cooled by said carbon-dioxide-poor stream, said second nitrogen-enriched fraction is fed to a separator and divided into a liquid fraction and a gas fraction, the gas fraction is fed to the rectification above the removal point of said second nitrogen-enriched fraction, and the liquid fraction is fed to the rectification as said reflux.

* * * * *